US011655905B2

(12) United States Patent
Ledvora et al.

(10) Patent No.: US 11,655,905 B2
(45) Date of Patent: May 23, 2023

(54) MULTI-PORT VALVE

(71) Applicants: Joe Ledvora, Wheaton, IL (US); Philip C. Hawken, Darien, IL (US); Thomas J. Davern, St. Charles, IL (US)

(72) Inventors: Joe Ledvora, Wheaton, IL (US); Philip C. Hawken, Darien, IL (US); Thomas J. Davern, St. Charles, IL (US)

(73) Assignee: Robertshaw Controls Company, Itasca, IL (US)

( * ) Notice: Subject to any disclaimer, the term of this patent is extended or adjusted under 35 U.S.C. 154(b) by 926 days.

(21) Appl. No.: 15/945,173

(22) Filed: Apr. 4, 2018

(65) Prior Publication Data
US 2018/0292016 A1 Oct. 11, 2018

Related U.S. Application Data

(60) Provisional application No. 62/483,167, filed on Apr. 7, 2017.

(51) Int. Cl.
*F16K 11/085* (2006.01)
*F16K 5/04* (2006.01)

(52) U.S. Cl.
CPC ........ *F16K 11/0856* (2013.01); *F16K 5/0471* (2013.01); *F16K 11/0853* (2013.01)

(58) Field of Classification Search
CPC .. F16K 11/076; F16K 27/041; F16K 11/0853; F16K 11/0856; F16K 5/0471; Y10T 137/86863
USPC .................................................... 137/625.46
See application file for complete search history.

(56) References Cited

U.S. PATENT DOCUMENTS

| | | | |
|---|---|---|---|
| 1,422,178 | A | 7/1922 | Cooley |
| 3,251,408 | A | 5/1966 | Watson et al. |
| 3,927,693 | A | 12/1975 | Johnston |
| 4,429,717 | A | 2/1984 | Montgomery |
| 5,431,189 | A | 7/1995 | Jones |
| 5,529,758 | A | 6/1996 | Houston |
| 5,871,032 | A | 2/1999 | Ko |
| 6,245,233 | B1 | 6/2001 | Lu |
| 7,506,664 | B2 | 3/2009 | Norris et al. |

(Continued)

FOREIGN PATENT DOCUMENTS

| | | |
|---|---|---|
| CN | 103857436 A | 6/2014 |
| EP | 2713083 A1 | 4/2014 |

(Continued)

OTHER PUBLICATIONS

Forbes, Tesla Goes Open Source: Elon Musk Releases Patents to "Good Faith" Use, Jun. 12, 2014, 3 pages; https://www.forbes.com/sites/briansolomon/2014/06/12/tesla-goes-open-source-elon-musk-releases-patents-to-good-faith-use/#113922913c63.

(Continued)

*Primary Examiner* — Michael R Reid
(74) *Attorney, Agent, or Firm* — Reinhart Boerner Van Deuren P.C.

(57) ABSTRACT

A multi-port valve is provided. The multi-port valve includes a housing which defines an internal cavity. The housing further includes a plurality of ports. Each of the plurality of ports is in communication with the internal cavity. A shell body is rotatably disposed within the internal cavity. A seal member is also provided which has a plurality of openings and surrounds the shell body such that it circumscribes the shell body within the internal cavity.

8 Claims, 14 Drawing Sheets

(56) References Cited

U.S. PATENT DOCUMENTS

| | | | |
|---|---|---|---|
| 7,837,771 B2* | 11/2010 | Barone | B01D 53/0476 |
| | | | 137/625.32 |
| 8,336,319 B2 | 12/2012 | Johnston et al. | |
| 8,402,776 B2 | 3/2013 | Johnston et al. | |
| 8,557,415 B2 | 10/2013 | Herron et al. | |
| 8,557,416 B2 | 10/2013 | Mardall et al. | |
| 9,212,751 B2 | 12/2015 | McLane et al. | |
| 9,523,434 B2* | 12/2016 | Nagahama | F16K 5/0471 |
| 9,527,403 B2 | 12/2016 | Mardall et al. | |
| 9,618,128 B2 | 4/2017 | Dourdeville et al. | |
| 9,687,769 B2 | 6/2017 | Mardall et al. | |
| 9,701,210 B2 | 7/2017 | Woo et al. | |
| 9,865,852 B2 | 1/2018 | Haer et al. | |
| 2004/0221901 A1 | 11/2004 | Chen | |
| 2006/0118066 A1* | 6/2006 | Martins | F01P 7/165 |
| | | | 123/41.08 |
| 2006/0237359 A1 | 10/2006 | Lin et al. | |
| 2008/0108955 A1* | 5/2008 | Blickhan | A61M 5/16827 |
| | | | 604/248 |
| 2008/0223464 A1 | 9/2008 | Merrell | |
| 2010/0319796 A1 | 12/2010 | Whitaker | |
| 2011/0296855 A1 | 12/2011 | Johnston et al. | |
| 2012/0183815 A1 | 7/2012 | Johnston et al. | |
| 2012/0231306 A1 | 9/2012 | Herron et al. | |
| 2012/0237803 A1 | 9/2012 | Mardall et al. | |
| 2014/0053931 A1 | 2/2014 | Whitaker | |
| 2014/0090414 A1 | 4/2014 | McLane et al. | |
| 2014/0193683 A1 | 7/2014 | Mardall et al. | |
| 2015/0217654 A1 | 8/2015 | Woo et al. | |
| 2015/0306974 A1 | 10/2015 | Mardall et al. | |
| 2015/0354716 A1 | 12/2015 | Morein | |
| 2016/0200206 A1 | 7/2016 | Woo et al. | |
| 2016/0380248 A1 | 12/2016 | Haer et al. | |
| 2017/0056806 A1 | 3/2017 | Mardall et al. | |
| 2017/0096073 A1 | 4/2017 | Mardall et al. | |
| 2017/0152957 A1 | 6/2017 | Roche et al. | |
| 2017/0214008 A9 | 7/2017 | Mardall et al. | |
| 2017/0253107 A1 | 9/2017 | Castiglioni et al. | |
| 2017/0259200 A1 | 9/2017 | Mardall et al. | |
| 2018/0292016 A1 | 10/2018 | Ledvora et al. | |

FOREIGN PATENT DOCUMENTS

| | | |
|---|---|---|
| EP | 2921750 A1 | 9/2015 |
| FR | 2940396 A1 | 6/2010 |
| GB | 270997 | 5/1927 |
| JP | 2015034560 A | 2/2015 |

OTHER PUBLICATIONS

Randall et al., Bloomberg Businessweek, Hell for Elon Musk is a Midsize Sedan, Jul. 12, 2018, 15 pages, https://www.bloomberg.com/news/features/2018-07-12/how-tesla-s-model-3-became-elon-musk-s-version-of-hell.

Tesla Motors Club, Tesla Thermal Management System—explanation, Mar. 25, 2017, 11 pages, https://teslamotorsclub.com/tmc/threads/tesla-thermal-management-system-explanation.88055/.

Peiwen Lu et al., *Valve Selection Manual*, China Machine Press, May 2001, Beijing, pp. 355, 357-360.

Kelin Xu et al., *Fundamentals of Pneumatic Technology*, Chongqing University Press, Feb. 1997, pp. 79-80.

\* cited by examiner

MULTI-PORT VALVE

CROSS-REFERENCE TO RELATED PATENT APPLICATION

This patent application claims the benefit of U.S. Provisional Patent Application No. 62/483,167, filed Apr. 7, 2017, the entire teachings and disclosure of which are incorporated herein by reference thereto.

FIELD OF THE INVENTION

This invention generally relates to valves, and more particularly to multi-port valves having multiple inlet and multiple outlet ports.

BACKGROUND OF THE INVENTION

Multi-port valve are used in a variety of industries and applications. Such valves include one or more inlet ports and on or more outlet ports. A valve member disposed within a housing of the valve is responsible for governing the flow between the various ports. A portion of the valve member, e.g. a valve stem, protrudes from the housing and is acted upon by an actuator attached to the multi-port valve. As a result, the actuator governs the position of the valve member within the housing, which in turn governs the flow between the various ports.

Such multi-port valves advantageously provide a single flow device which can effectively replace multiple flow devices which only employ a single inlet and a single outlet. However, such multi-port valves are not without their own drawbacks. For example, the overall complexity of the valve increases as the number of ports increases. This can lead to relatively high part count assemblies. Further, this complexity in construction also results in a more complex manufacturing process for making valve. Indeed, the multiple ports are associated with multiple inlets and outlets of the valve which must be welded onto a housing. Further the desired fitting for each inlet and outlet must also be welded on to its respective inlet or outlet.

Such welded up assemblies increase the number of potential leak paths of the valve. Further, to achieve such welds, special machining steps are often needed at the inlets and outlets as well as the housing to ensure there is a tight fit between these components for subsequent welding.

Furthermore, a number of individual seals are required to effectively seal the various ports of the multi-port valve off from one another. These multiple seals also lead to an increase in overall cost and complexity of the multi-port valve.

Accordingly, there is a need in the art for a multi-port valve with a reduced overall complexity. The invention provides such a multi-port valve. These and other advantages of the invention, as well as additional inventive features, will be apparent from the description of the invention provided herein.

BRIEF SUMMARY OF THE INVENTION

In one aspect, the invention provides a multi-port valve having a reduced part count and a reduced cost relative to prior designs. An embodiment of such a multi-port valve includes a housing. The housing defines an internal cavity. The housing further includes a plurality of ports. Each of the plurality of ports is in communication with the internal cavity. This embodiment also includes a shell body rotatably disposed within the internal cavity. A seal member is also provided which has a plurality of openings and surrounds the shell body such that it circumscribes the shell body within the internal cavity.

In certain embodiments, each opening of the plurality of openings of the seal member is associated with one of the plurality of ports such that each of the plurality of ports are sealed from one another along the outer periphery of the seal member.

In certain embodiments, the plurality of ports includes a first port and a second port. The first port and second port of the plurality of ports are arranged relative to one another such that they are one of angularly spaced apart from one another in an angular direction and situated at a same axial height relative to a longitudinal axis of the housing, or in at least a partially angularly overlapped arrangement relative to one another in the angular direction and are axially spaced from one another relative to the longitudinal axis.

In certain embodiments, the shell body includes a partition wall separating the shell body into a first portion and a second portion. The first portion includes a first opening and a second opening separated by a wall, and the second portion includes a first opening, a second opening, and a third opening. In another embodiment, the first portion includes a passageway and the second portion includes a passageway.

In certain embodiments, the first and second portions are selectively alignable with the plurality of ports to allow simultaneous flow along a first flow path and a second flow path through the shell body.

In certain embodiments, the seal member seals outwardly in a radial direction against an interior surface of the housing. In other embodiments, the seal member includes a plurality of seal ribs which seal against the shell body. The seal member may be one of a continuous piece of elastomeric material, or comprises a rigid core with a plurality of elastomeric seals attached thereto.

In certain embodiments, the valve also includes a plurality of port bodies, respectively received in the plurality of ports such that one port body of the plurality of port bodies is received in one port of the plurality of ports.

In certain embodiments, the seal member comprises a plurality of seal segments. One of the seal segments sealingly engages a first and a second port body of the plurality of port bodies.

In another aspect, the invention provides a multi-port valve which utilizes a novel and inventive sealing arrangement for sealing each of the plurality of ports from one another. An embodiment according to this aspect includes a housing defining an internal cavity. The housing also includes a plurality of ports. Each of the plurality of ports is in communication with the internal cavity. This embodiment also includes a shell body rotatably disposed within the internal cavity. A seal member is also provided which has a plurality of openings. Each one of the plurality of openings is associated with one of the plurality of ports such that each of the plurality of ports are sealed from one another along the outer periphery of the seal member.

In certain embodiments, the shell body includes a partition wall separating the shell body into a first portion and a second portion. The first portion includes a first opening and a second opening separated by a wall. The second portion includes a first opening, a second opening, and a third opening. In another embodiment, the first portion includes a passageway. The second portion also includes a passageway.

In either of the aforementioned embodiments, the first and second portions are selectably alignable with the plurality of ports to allow simultaneous flow along a first flow path and a second flow path through the shell body.

In certain embodiments, the seal member seals outwardly in a radial direction against an interior surface of the housing. In other embodiments, the seal member includes a plurality of seal ribs which seal against the shell body. The seal member may be one of a continuous piece of elastomeric material, or comprises a rigid core with a plurality of elastomeric seals attached thereto.

In certain embodiments, the valve also includes a plurality of port bodies, respectively received in the plurality of ports such that one port body of the plurality of port bodies is received in one port of the plurality of ports.

In certain embodiments, the seal member comprises a plurality of seal segments. One of the seal segments sealingly engages a first and a second port body of the plurality of port bodies.

In yet another aspect, the invention provides a multi-port valve which leverages a novel and inventive port arrangement to allow for separate simultaneous flows through the multi-port valve along separate flow paths. An embodiment according to this aspect includes a housing which defines an internal cavity. The housing further includes a plurality of ports. A first port and a second port of the plurality of ports are arranged relative to one another such that they are one of angularly spaced apart from one another in an angular direction and situated at a same axial height relative to a longitudinal axis of the housing, or in at least a partially angularly overlapped arrangement relative to one another in an angular direction and are axially spaced from one another relative to the longitudinal axis. This embodiment also includes a shell body rotatably disposed within the internal cavity. A seal member is also provided which surrounds the shell body. The seal member is radially interposed between the shell body and the housing.

In certain embodiments, the shell body includes a partition wall separating the shell body into a first portion and a second portion. The first portion and the second portion are selectably alignable with the plurality of ports to allow simultaneous flow along a first and a second flow path through the shell body.

In certain embodiments, the seal member includes a plurality of receiving grooves and the housing includes a plurality of projections. Each one of the plurality of receiving grooves receives one of the plurality of projections. The seal member may be one of a continuous piece of elastomeric material, or comprises a rigid core with a plurality of elastomeric seals attached thereto.

In certain embodiments, the valve also includes a plurality of port bodies, respectively received in the plurality of ports such that one port body of the plurality of port bodies is received in one port of the plurality of ports.

In certain embodiments, the seal member comprises a plurality of seal segments. One of the seal segments sealingly engages a first and a second port body of the plurality of port bodies.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the figures, as will be understood from the following, embodiments of a multi-port valve assembly and its associated multi-port valve are described herein. The multi-port valve advantageously overcomes existing problems in the art by presenting an overall construction with a reduced part count, a reduced number of potential leak paths, and a reduction in overall assembly time and cost.

Figure 1:
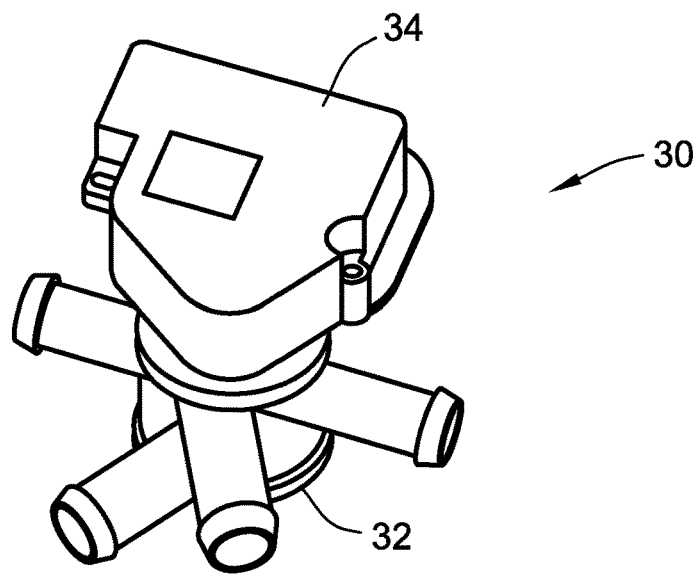
FIG. 1 is a perspective view of one embodiment of a multi-port valve according to the teachings of the present invention.

With particular reference now to FIG. 1, an embodiment of a valve assembly 30 according to the invention is illustrated. The valve assembly 30 includes valve assembly 30 includes a multi-port valve 32 (also referred to herein as a valve) and an actuator 34 mounted to valve 32. Actuator 34 is responsible for actuating a valve member (i.e. a shell member 58 as described below) which in turn governs the flow characteristics through valve 32. Actuator 34 may be any style of actuator typically used in valve actuation, e.g. rotary, linear, etc., and may rely on any type of power source typically used in valve actuation, e.g. electric, hydraulic, pneumatic, etc. As such, actuator 34 is non-limiting on the invention herein.

Figure 2:
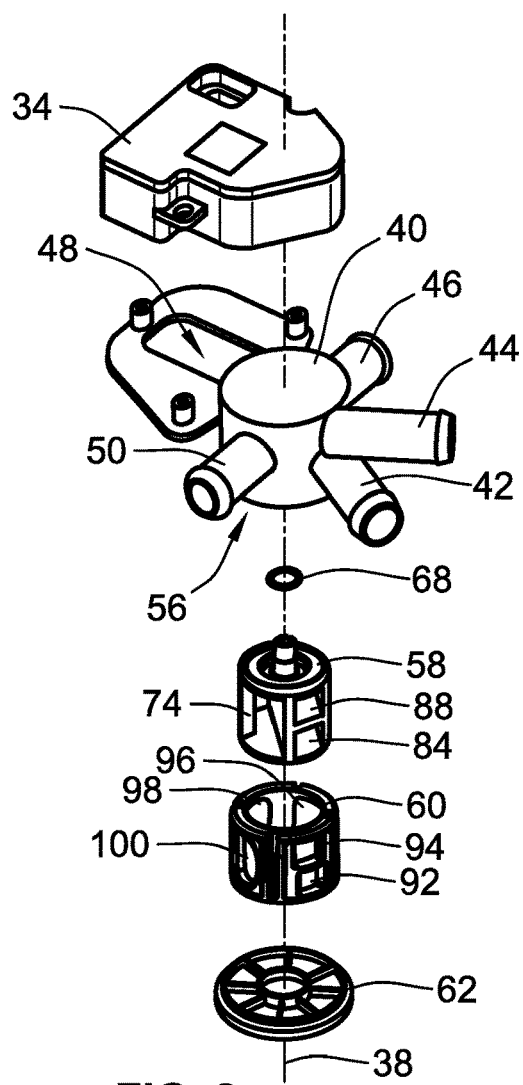
FIG. 2 is a perspective exploded view of the embodiment of FIG. 1.

Turning now to FIG. 2, valve assembly 30 is shown in an exploded view to introduce the componentry thereof, in particular, the componentry of valve 32. Valve 32 includes a housing 40. In one advantageous implementation of the invention, housing 40 is formed as a single piece. By "formed as a single piece" it is meant that the main body of housing 40 and its associated ports are not an assembly of separate components which are subsequently joined together by a joining process, e.g. welding as is done in conventional valve housings. Rather, housing 40 is formed as a single unitary piece by any process capable of achieving such a configuration, e.g. injection molding, 3D printing, etc. However, it is contemplated by the teachings herein that housing 40 may be embodied as an assembly of separate components which are subsequently joined together by a joining process.

However, there are several advantages to utilizing a housing 40 formed as a single piece. First, such a single piece housing 40 presents a direct reduction of parts but a retention in function over prior designs. Indeed, separate components need not be separately fabricated and subsequently assembled. Further, in such assembled housings, it is typically necessary to weld on port conduits, fittings, actuator mounting features, etc. Many of these weld joints are along the fluid flow path through the valve, and as a result, present potential leak paths in the event one or more of these welds fail. Still further, use of a single piece housing 40 allows for direct incorporation of mounting features on housing 40 which are subsequently used to mount valve 32 in its operational environment. Still further, the single piece housing 40 illustrated allows for a single direction of assembly along longitudinal axis 38 defined by housing 40. This is an improvement over prior multi-port valves which typically involve multiple directions of assembly relative to their respective housings.

As illustrated, housing 40 includes a plurality of ports, in particular, a first port 42, a second port 44, a third port 46, a fourth port 48, and a fifth port 50, each of which are in fluid communication with an internal cavity 56 of housing 40. Each of ports 42, 44, 44, 46, 48, 50 may function as an inlet or an outlet of valve 32. As can be seen in FIG. 2, first port 42 and second port 44 are in an over/under configuration. As a result, first port 42 and second port 44 at least partially overlap one another in the angular direction relative to longitudinal axis 38. As can also be seen in FIG. 2, while overlapping one another partially in the angular direction, first port 42 and second port 44 are also axially spaced apart relative to longitudinal axis 38.

Such a configuration is particularly advantageous where first and second ports 42, 44 function as inlets. Indeed, in prior multi-port valve designs, a side-by-side inlet port approach is typically taken where the ports are spaced apart from one another in the angular direction (i.e. they do not overlap in the angular direction as shown in FIG. 2). With such a side-by-side configuration, there is a "dead zone" between the inlet ports as a result of the necessity to include a seal between the inlet ports to prevent unintended cross flow. This same seal, however, creates a dead zone which reduces the overall flow when it is desirable to combine the flows of the side-by-side inlet ports. Such a dead zone is, however, eliminated by utilizing the over/under configuration as shown.

Still referring to FIG. 2, internal cavity 56 receives a shell body 58 which operates as a valve member for controlling the flows between the plurality of ports 42, 44, 46, 48, 50. A seal member 60 is also received in cavity 56 and entirely surrounds shell body 58. This seal member 60 is a continuous cylindrical element, except for the openings formed therein. As will be discussed below, seal member 60 is a single piece seal which advantageously creates a seal for each of the plurality of ports 42, 44, 46, 48, 50 to prevent unintended cross flow or short circuiting.

Seal member 60 also advantageously entirely seals internal cavity 56, such that no additional seals need be associated with a cover 62 of valve 32. It is possible, however, that seal member 60 may also be formed as separate seal segments which immediately next to one another in the circumferential direction, which together define a seal member which surrounds the shell body 58. The term "seal member" as used herein includes both configurations, i.e. a single unitary seal member, or a seal member formed of a plurality seal segments.

As can be seen from FIG. 2, each of shell body 58 and seal member 60 include a plurality of openings. The openings of seal member 60 remain statically aligned with ports 42, 44, 46, 48, 50 so that each opening is associated with one port, and seals against an interior surface of housing 40 that defines cavity 56, around the opening of the port into cavity 56. The plurality of openings through shell body 58, however, are selectively alignable with ports 42, 44, 46, 48, 50 to govern the flows between these ports.

Figure 3:
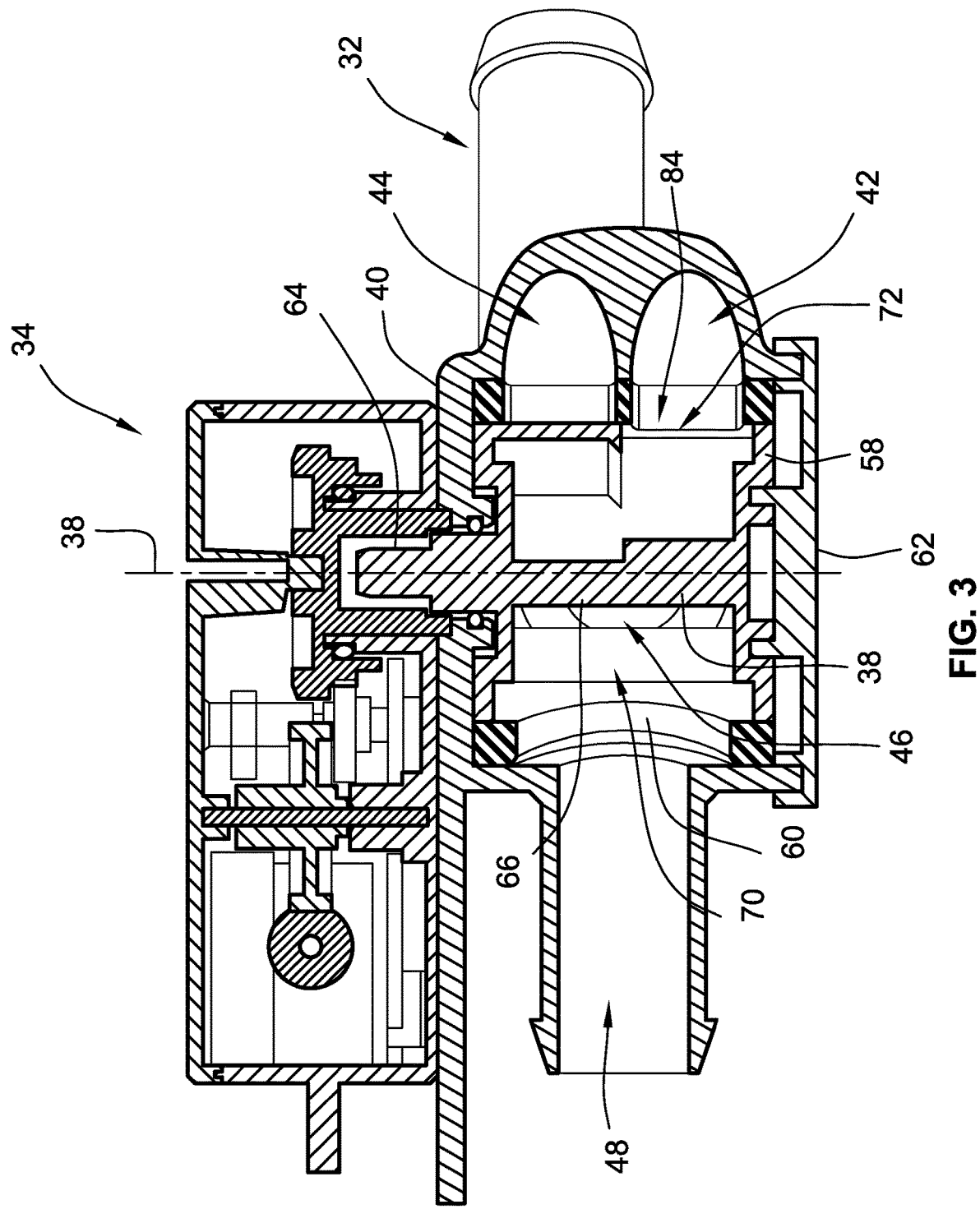
FIG. 3 is a cross sectional view of the embodiment of FIG. 1, taken along a first plane.

Turning now to FIG. 3, which illustrates a cross section of valve 32 in an assembled configuration, shell body 58 is generally cylindrical in shape with a valve stem 64 which extends through an opening in housing 40. This valve stem, and in turn the remainder of shell body 58, is rotatable about axis 38 by actuator 34. Shell body 58 also includes a partition wall 66 aligned with valve stem 64 and divides shell body 58 into a first portion 70 and a second portion 72. First portion 70 includes a first opening 74 (see FIG. 4) and a second opening 76 (see FIG. 4) which are separated by a wall 78 (see FIG. 4). First and second openings 74, 76 are in fluid communication with one another through the interior of shell body 58.

Second portion 72 includes a first opening 84, a second opening 86 (see FIG. 7), and a third opening 88 (see FIG. 4), each of which are in fluid communication with one another through the interior of shell body 58. As will be understood by the following, partition wall 66 and its division of shell body 58 into two separation portions 70, 72 having the aforementioned openings allows for multiple simultaneous and separate flows through valve 32.

Figure 4:
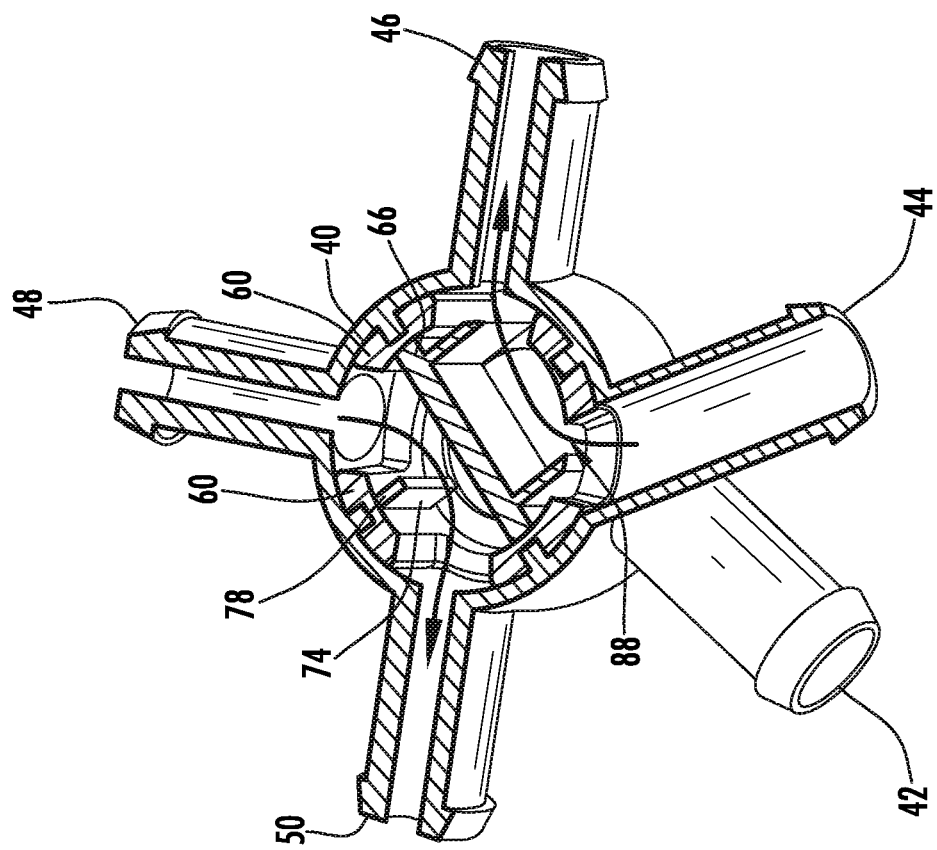
FIGS. 4 and 5 are perspective cross sections of the embodiment of FIG. 1 taken along a second plane orthogonal to the first plane.
Figure 5:
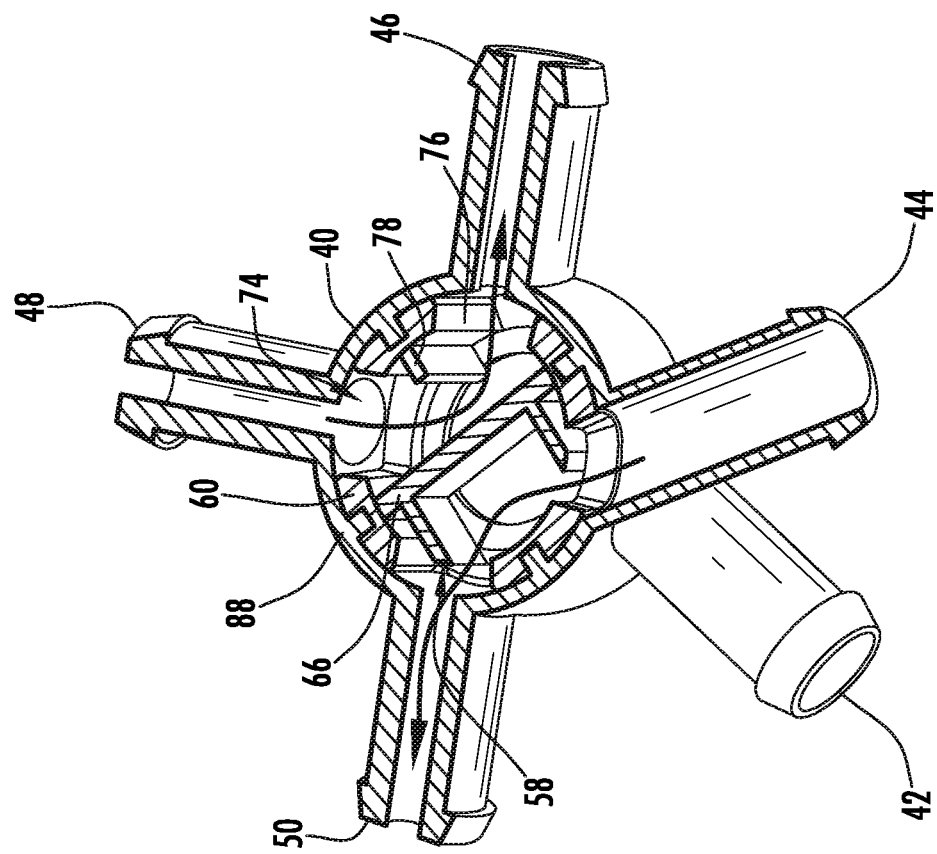

Indeed, with particular reference to FIG. 4, in the particular orientation of shell body 58 shown, a combined flow from first and second ports 42, 44 passes through second portion 72 of shell body 58 and exits through fifth port 50. Simultaneously, a flow from fourth port 48 passes through first portion 70 of shell body 58 and exits through third port 46. Turning now to FIG. 5, shell body 58 has been rotated approximately ninety degrees from the orientation shown in FIG. 4. In such a configuration a combined flow from first and second ports 42, 44 passes through second portion 72 of shell body 58 and exits through third port 46. Simultaneously, a flow from fourth port 48 passes through first portion 70 of shell body 58 and exits through fifth port 50.

As can be surmised from the configurations shown in FIGS. 4 and 5, the openings through shell body 58 are arranged such that, for example, flow from second port 44 alone, or a combined flow from first and second ports 42, 44, may flow to fifth port 50 without affecting the maximum flow from fourth port 48 to third port 46. The same holds true for the configuration shown in FIG. 5 in that, with only slight rotations of shell body 58, single or combined flows from first and second ports 42, 44 are possible without affecting maximum flow from fourth port 48 to fifth port 50.

Figure 6:
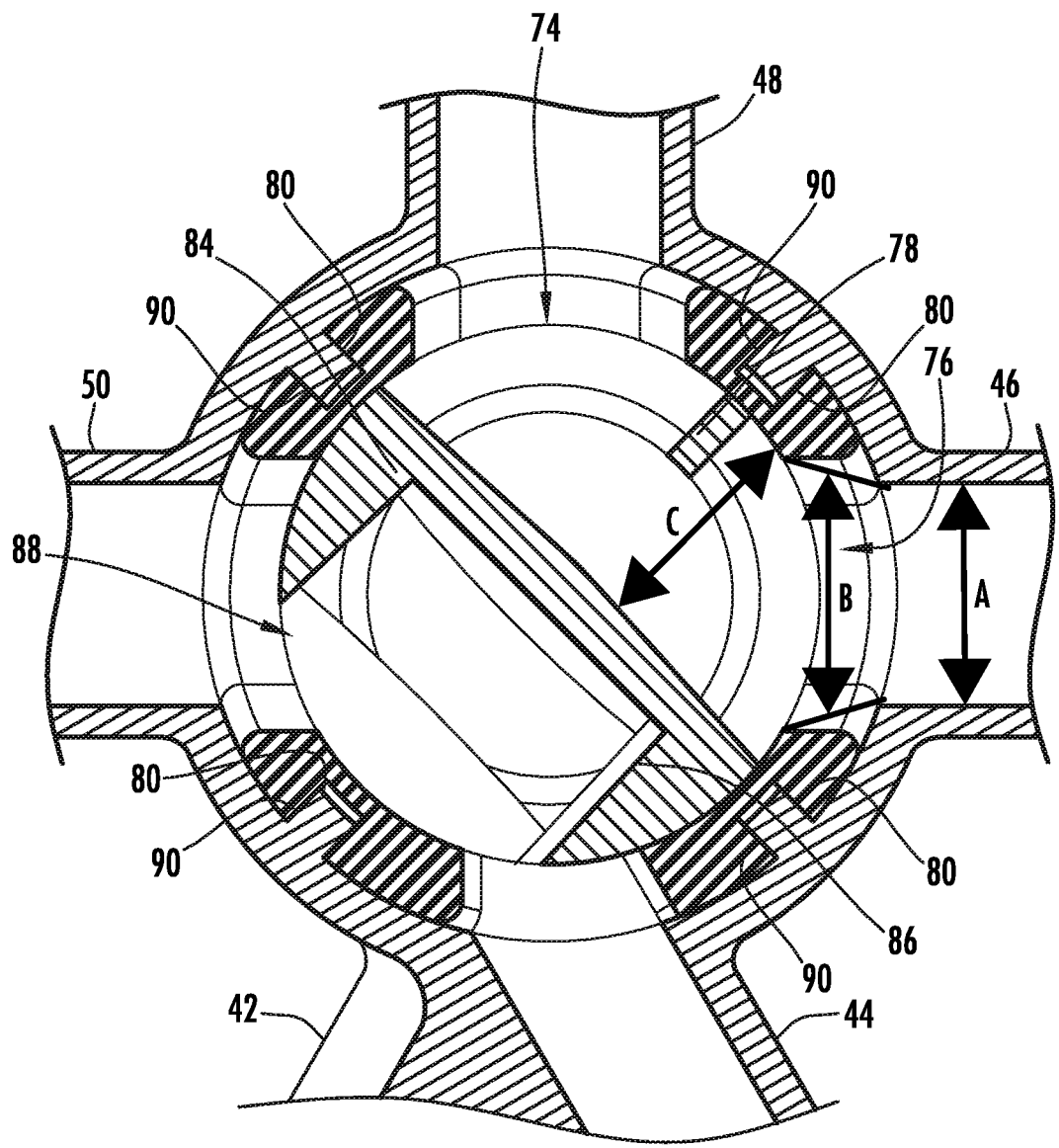
FIG. 6 is a cross section of the embodiment of FIG. 1 taken along a third plane orthogonal to the first plane.

Turning now to FIG. 6, another cross section of valve 32 is illustrated. In this particular cross section, another advantage of utilizing a unitary seal member 60 and the shell body 58 as described can be seen. In particular, the total flow area through each port 42, 44, 46, 48, 50 is governed by the shape of that port and is generally depicted as dimension A. However, the openings through seal member 60 are tapered to thereby continuously increase the cross sectional flow area as the flow approaches shell body 58. This increase can be seen at dimension B, which is larger than dimension A.

Such a configuration allows for shell body 58 to present a considerably larger cross sectional flow area represented by dimension C. These tapered openings through seal member 60 thus allow for the cross sectional flow area from each port 42, 44, 46, 48, 50 to adapt to the cross sectional flow area presented by shell body 58. The overall result with such a configuration is a reduction in the overall pressure drop across valve 32, and well as noise due to turbulence.

Also depicted in FIG. 6 is the mounting configuration used for mounting seal member 60 within housing 40. Specifically, seal member 60 includes a plurality of axially extending channels 80 which receive a plurality of axially extending ribs 90 formed in cavity 56 of housing 40. This channel-rib configuration fixes and clocks seal member 60 within housing 40. Although each channel 80 and rib 90 are shown to have a uniform shape, it is also contemplated that one or more of the channels 80 and their corresponding ribs 90 may be a different size to ensure that there is only one way to install seal member 60 within housing 40.

Figure 7:
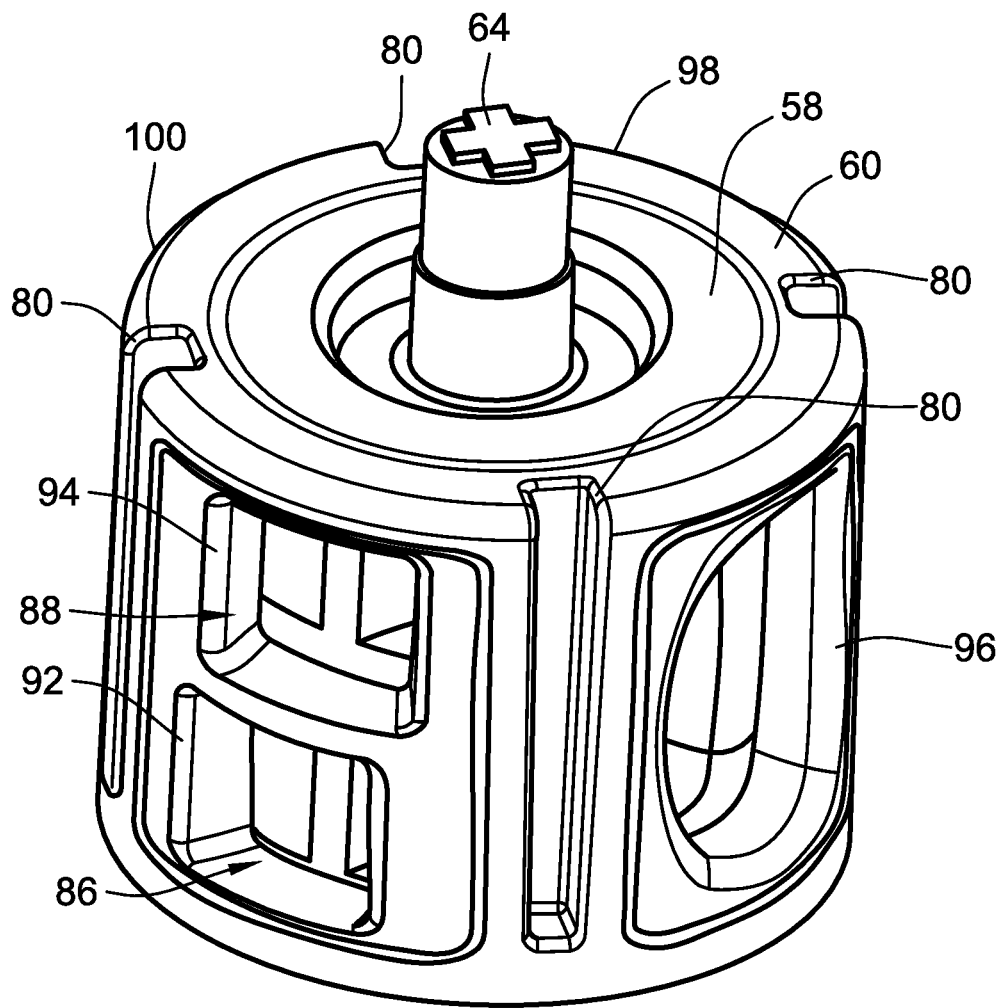
FIG. 7 is a perspective view of a shell body and unitary seal member of the embodiment of FIG. 1 in an assembled configuration.

Turning now to FIG. 7, the same illustrates seal member 60 installed around shell body 58. As introduced above, seal member 60 includes a plurality of openings. In particular, a first opening 92, a second opening 94, a third opening 96, a fourth opening 98 which is not visible in FIG. 7 but identical to third opening 96, and a fifth opening 100 which is also not visible in FIG. 7 but identical to third and fourth openings 96, 98. Each of the aforementioned openings in seal member 60 are also shown in FIG. 2. As discussed above, these openings seal around the ports of housing 40 at the entry of each port into cavity 56 (see FIG. 2). Indeed, opening 92 seals around first port 42, second opening 94 seals around second port 94, third opening 96 seals around third port 46, fourth opening 98 seals around forth port 48, and fifth opening 100 seals around fifth port 50.

Figure 8:
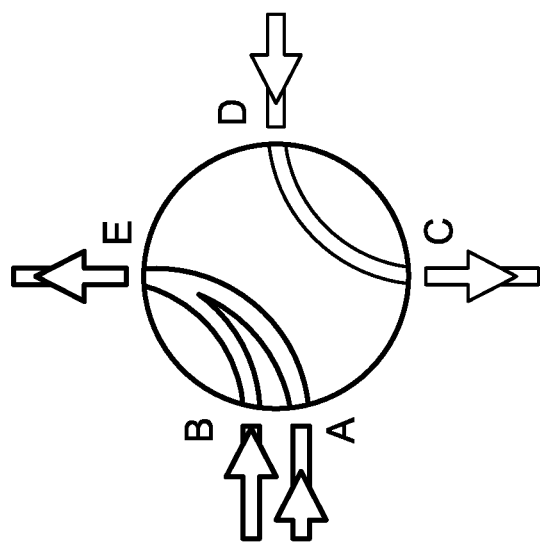

With the foregoing structural description in hand, the flow methodology of valve 32 will now be discussed in greater detail. Turning now to FIG. 8, the same schematically illustrates the flows previously described relative to FIG. 4. Flow line A may be considered to be that flow entering through first port 42, and flow line B may be considered to be that flow entering through second port 44. These flows are combined and exit as flow E, the flow exiting valve 32 through fifth port 50. As discussed above, it is possible under very minor rotations of shell body 58 to allow for only an entry flow A and an exit flow E, only an entry flow B and an exit flow E, or a mix of flows A and B which result in an exit flow E. In each of the aforementioned flow configurations, maximum entry flow D from fourth port 48 to exit flow C through third port 46 is still permitted.

Figure 10:
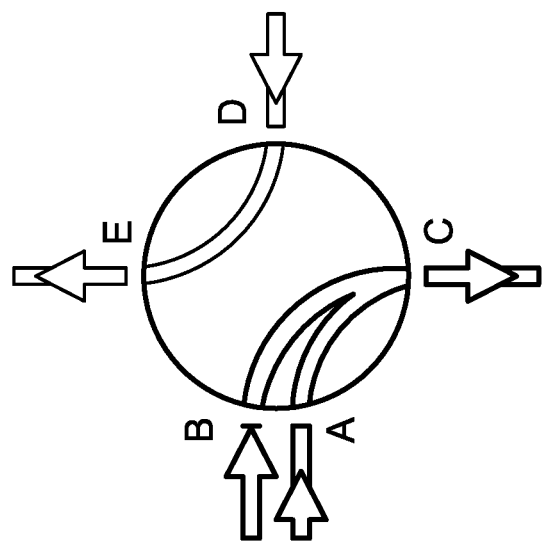
FIGS. 8-10 are schematic flow diagrams of the various flow paths of the embodiment of FIG. 1.
Figure 9:
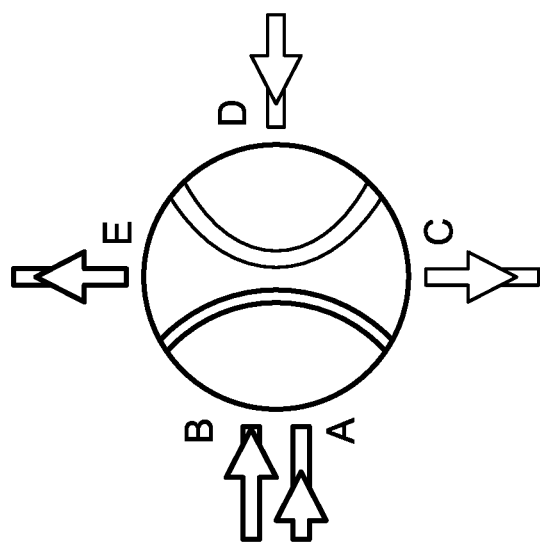

FIG. 9 similarly illustrates a flow schematic wherein valve 32 is in a neutral position, where no flow is permitted through valve 32. FIG. 10 schematically illustrates the flows previously described relative to FIG. 5. As can be seen in this view, flows A and B are combined and exit valve 32 as exit flow C through third port 46. It is also possible under very minor rotations of shell body 58 to allow for only an entry flow A and an exit flow C, only an entry flow B and an exit flow C, or a mix of flows A and B which result in an exit flow C. In each of the aforementioned flow configurations, maximum entry flow D from fourth port 48 to exit flow E through fifth port 50 is still permitted.

Figure 11:
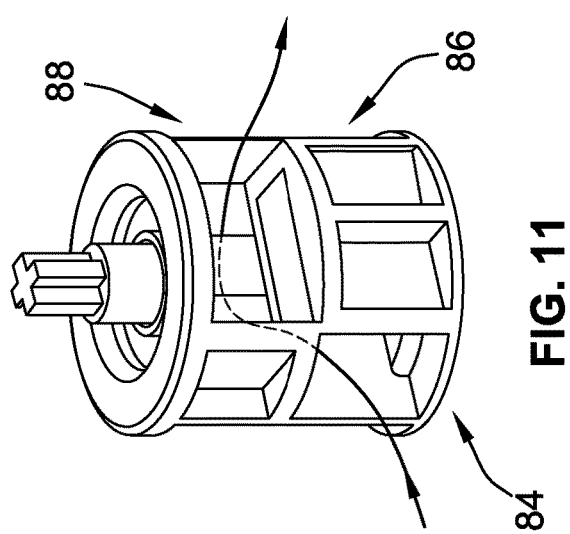
FIGS. 11-16 are perspective views of the shell body of FIG. 7 in varying orientations to schematically depict a flow path through the shell body in each configuration.
Figure 12:
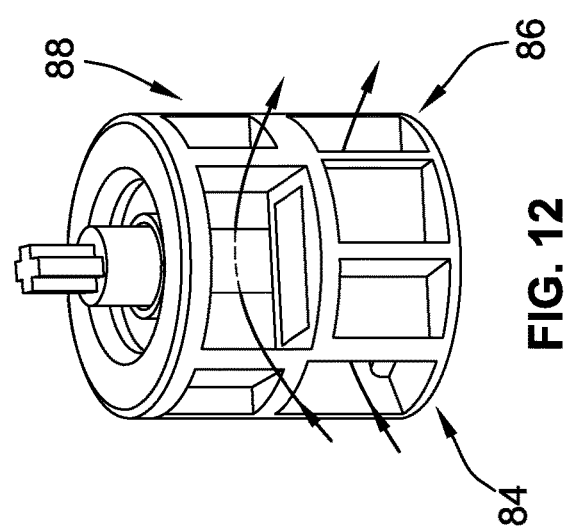
Figure 13:
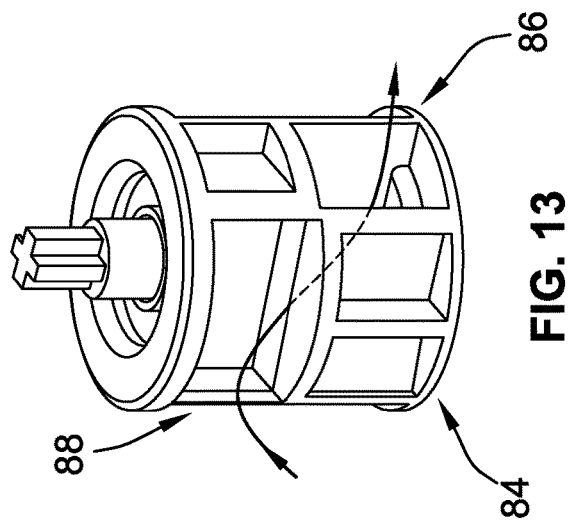

The aforementioned configurations are also each shown in FIG. 11-16, respectively in regard to the orientation of shell body 58. FIG. 11 illustrates flow from first port 42 through first opening 84 of second portion 72, through third opening 88 of second portion 72, and out to third port 46. FIG. 12 shows a combined flow from first and second ports 42, 44, through first and third openings 84, 88 of second portion 72, then through third and second openings 88, 86, and out to third port 46. FIG. 13 illustrates flow from second port 44 through third opening 88 of second portion 72, through second opening 86 of second portion 72, and out to third port 46.

Figure 14:
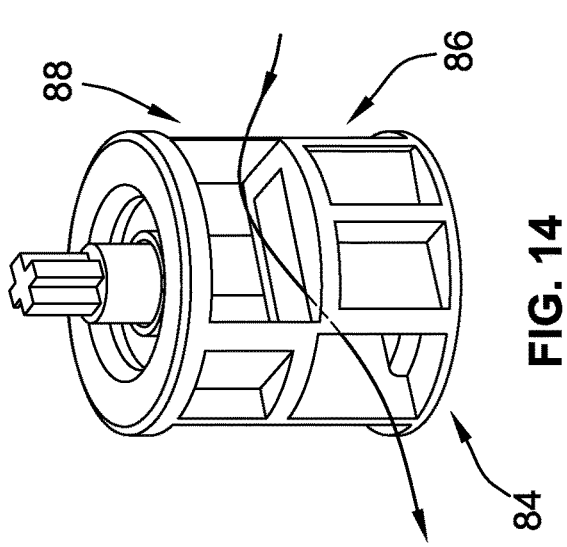
Figure 15:
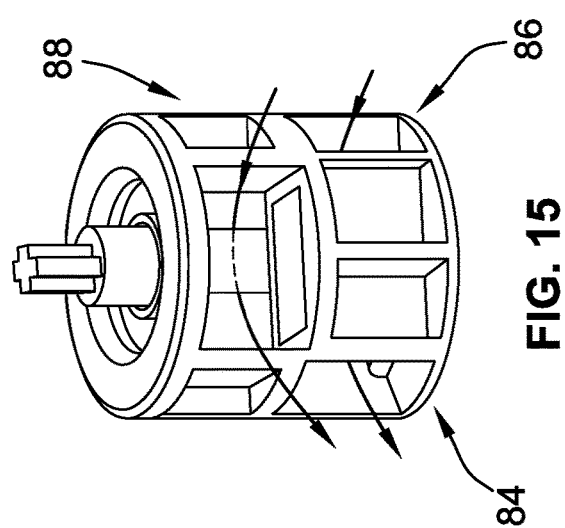
Figure 16:
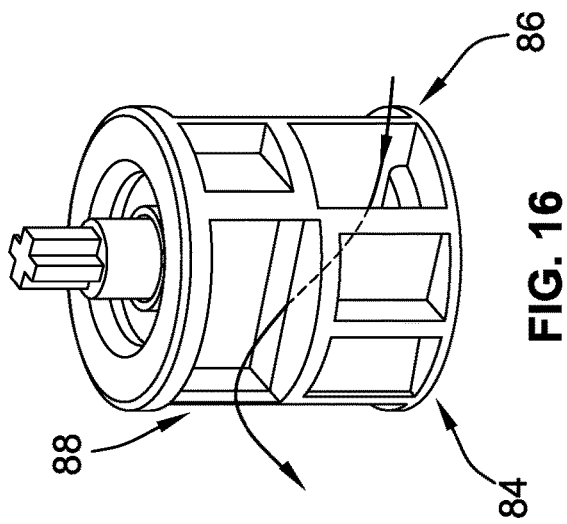

FIG. 14 illustrates flow from second port 46 through third opening 88 of second portion 72, through first opening 84 of second portion, and out to fifth port 50. FIG. 15 shows a combined flow from first and second ports 42, 44, through second and third openings 86, 88 of second portion 72, then through third and first openings 88, 84, and out to fifth port 50. FIG. 16 illustrates flow from first port 42 through second opening 86 of second portion 72, through third opening 88 of second portion, and out to fifth port 50. It will also be recognized that, while not shown in FIGS. 11-16 for clarity, there is also a simultaneous flow in addition to that depicted in each figure. For example, there is also a flow between fourth port 48 and fifth port 50 in the configuration shown in FIGS. 11-13. Similarly, there is also a flow between third and fourth ports 46, 48 in FIGS. 14-16.

Figure 17:
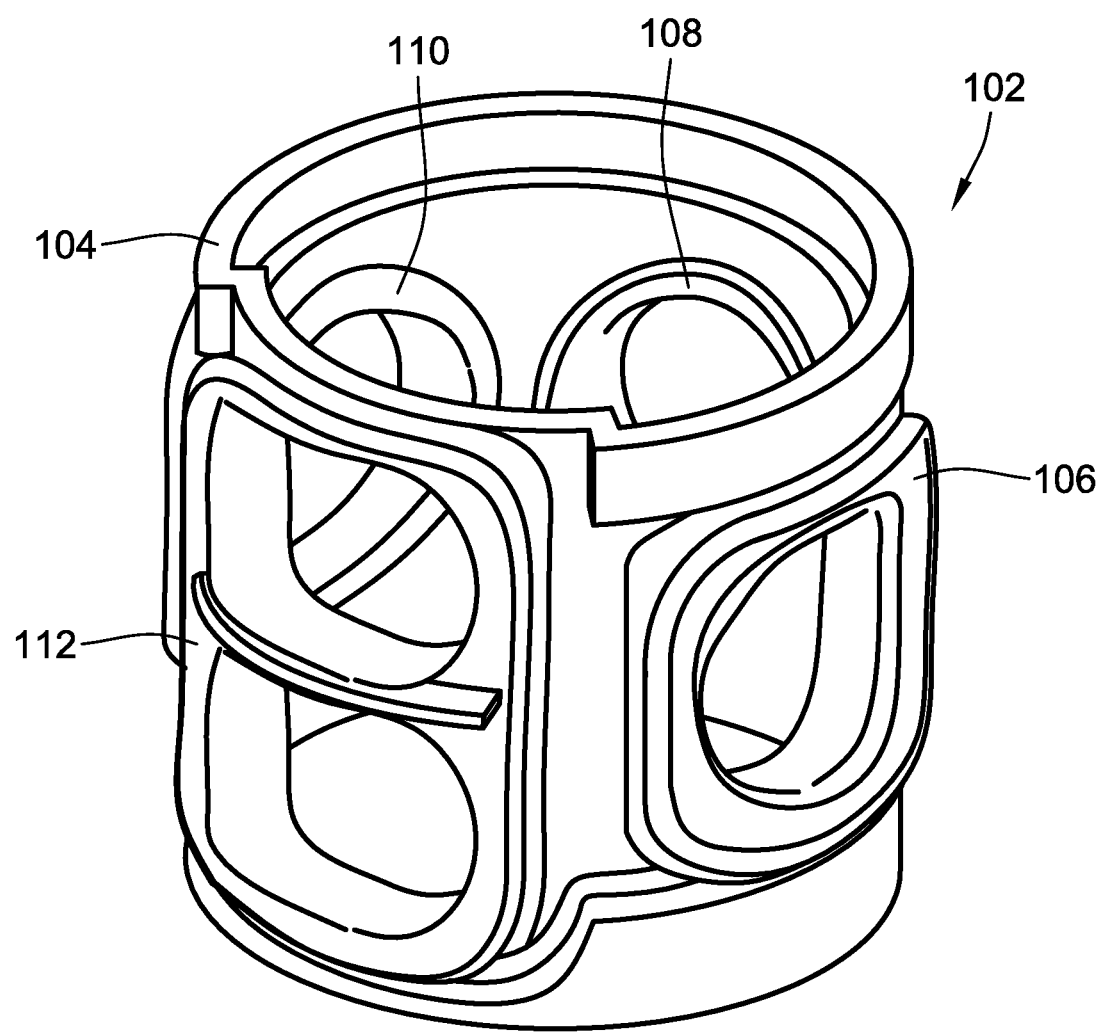
FIG. 17 is an alternative embodiment of the unitary seal member shown in FIG. 7.

Turning now to FIG. 17, an alternative embodiment of a seal member 102 is illustrated. This seal member 102 is similar to seal member 60 discussed above in that it fully surrounds shell body 58. However, this embodiment of a seal member 102 includes a generally rigid core 104 with elastomeric seal material attached thereto. More specifically, a first seal 106, second seal 108, third seal 110, and fourth seal 112 are attached to core 104. These seal members 106, 108, 110, 112 are formed of an elastomeric sealing material and collectively provide the same sealing function as seal member 60 described above. As can also be seen in FIG. 17, seal member 112 is a dual port seal in that it provides the above described seal for both first port 42 and second port 44.

Figure 18:
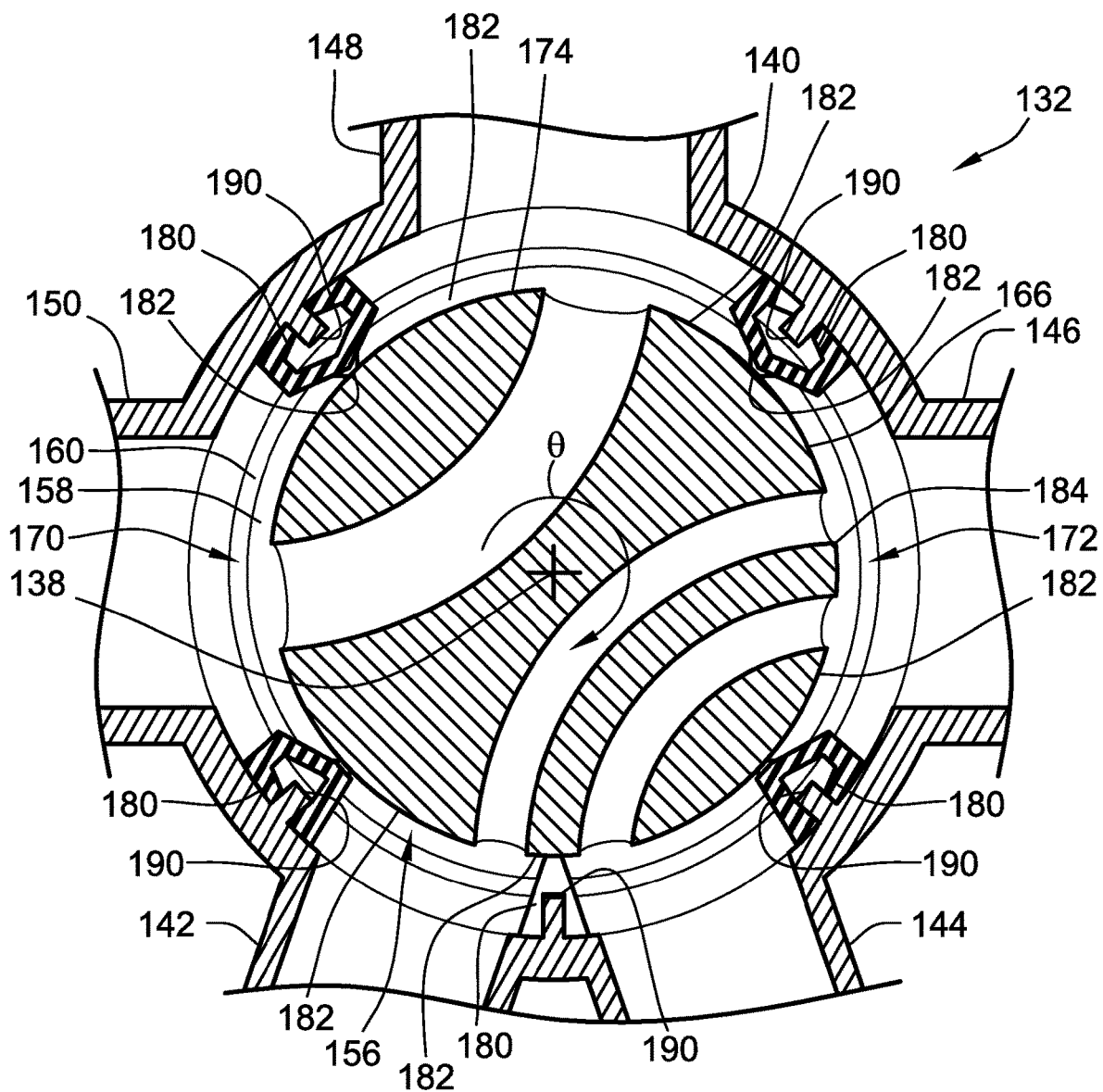
FIGS. 18 and 19 are cross sections of an alternative embodiment of a multiport valve according to the teachings herein.
Figure 19:
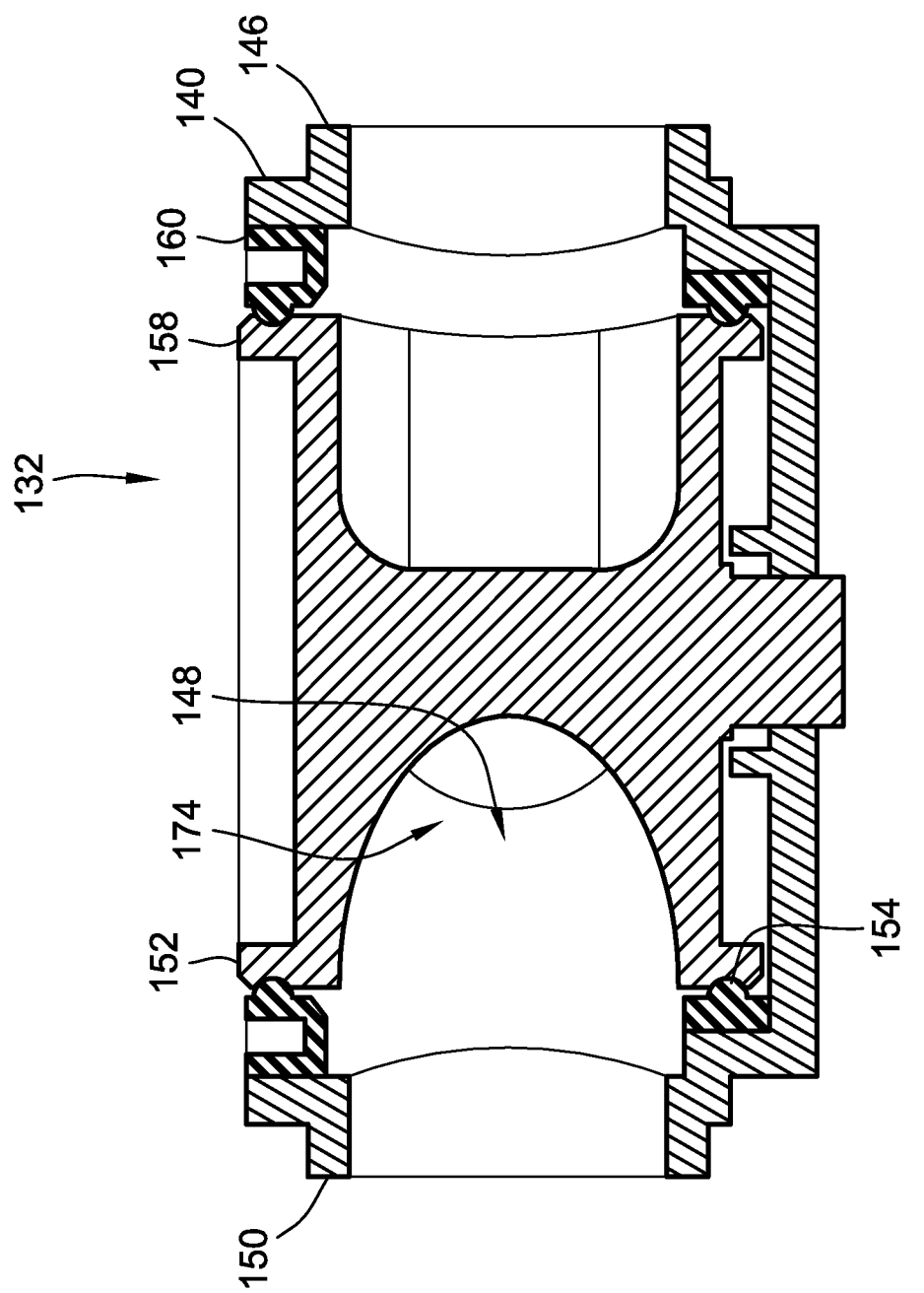

With reference now to FIGS. 18 and 19, an alternative embodiment of a valve 132 according to the teachings herein is illustrated. This valve 132 is also capable of the flow configurations illustrated in FIGS. 8-10. This valve 132 is also substantially similar to that described above in that may utilize a housing 140 formed as a single piece. This housing 140 also includes a plurality of ports, namely, a first port 142, second port 144, third port 146, fourth port 148, and fifth port 150. Instead of using an over/under configuration for first and second ports 142, 144 as described above, however, first and second ports 142, 144 are arranged in a side-by-side configuration. With this arrangement, first and second ports 142, 144 are spaced apart in the angular direction θ and located at the same axial height relative to longitudinal axis 138.

A shell body 158 and seal member 160 are received in an internal cavity 156 of housing 140. Seal member 160 also differs from seal member 60 described above in that it seals radially inward against shell body 158 as shown, as opposed to radially outward as in the case of seal member 60 and seal member 102 described above. Indeed, seal member 160 includes a plurality of receiving channels 180 as shown. Each receiving channel 180 receives a corresponding rib 190 formed on housing 140 within internal cavity 156. This channel and rib configuration fixes and clocks seal member 160 within housing 140. Each channel 180 also includes an radially inwardly protruding sealing bead 182 as shown. These sealing beads 182 seal against shell body 158 to achieve similar sealing functionality to that described above. Although seal member 160 is illustrated a single unitary piece which surrounds shell body 158, it is also contemplated that this seal member 160 may be separated into multiple seal segments as discussed above. In a particular configuration, and similar to that described above relative to FIG. 17, if provided as separate seal segments, one of such seal segments can provide sealing functionality for both first and second ports 142, 144.

As can also be seen in FIG. 18, shell body 158 includes a partition wall 166 which divides it into a first portion 170 and a second portion 172. First portion 170 includes a passageway 174 extending through shell body 158 along a curved path. Likewise, second portion 172 includes a passageway extending through shell body 158 along a curved path. It will be noted that the curved path in second portion 172 includes a divider wall 184 subdividing it into separate, sub-passageways. It will be recognized from analysis of FIG. 18 that the same simultaneous flow path configurations described above relative to FIGS. 11-16 are possible with this embodiment.

Turning now to FIG. 19, another cross section of valve 132 is illustrated. As shown in this view, seal member 160 also includes circumferential seals 152, 154 which run circumferentially at the axial extents of seal member 160. These seals 152, 154, ensure fluid cannot circumvent sealing ribs 182 discussed above.

With reference now to FIGS. 20 to 23, another alternative embodiment of a valve 200 according to the teachings herein is illustrated. This embodiment of valve 200 is also capable of the flow configurations illustrated in FIGS. 8-10. This embodiment of valve 200 also employs a side-by-side port configuration in the same arrangement as that of the embodiment described above relative to FIGS. 18 and 19. The following description, however, is not limited to the side-by-side port configuration as discussed above relative to FIGS. 18 and 19. Indeed, the following description could also apply to a valve constructed according to the teachings of the embodiment of FIGS. 1-17, i.e. a valve having an over-under portion configuration.

Figure 20:
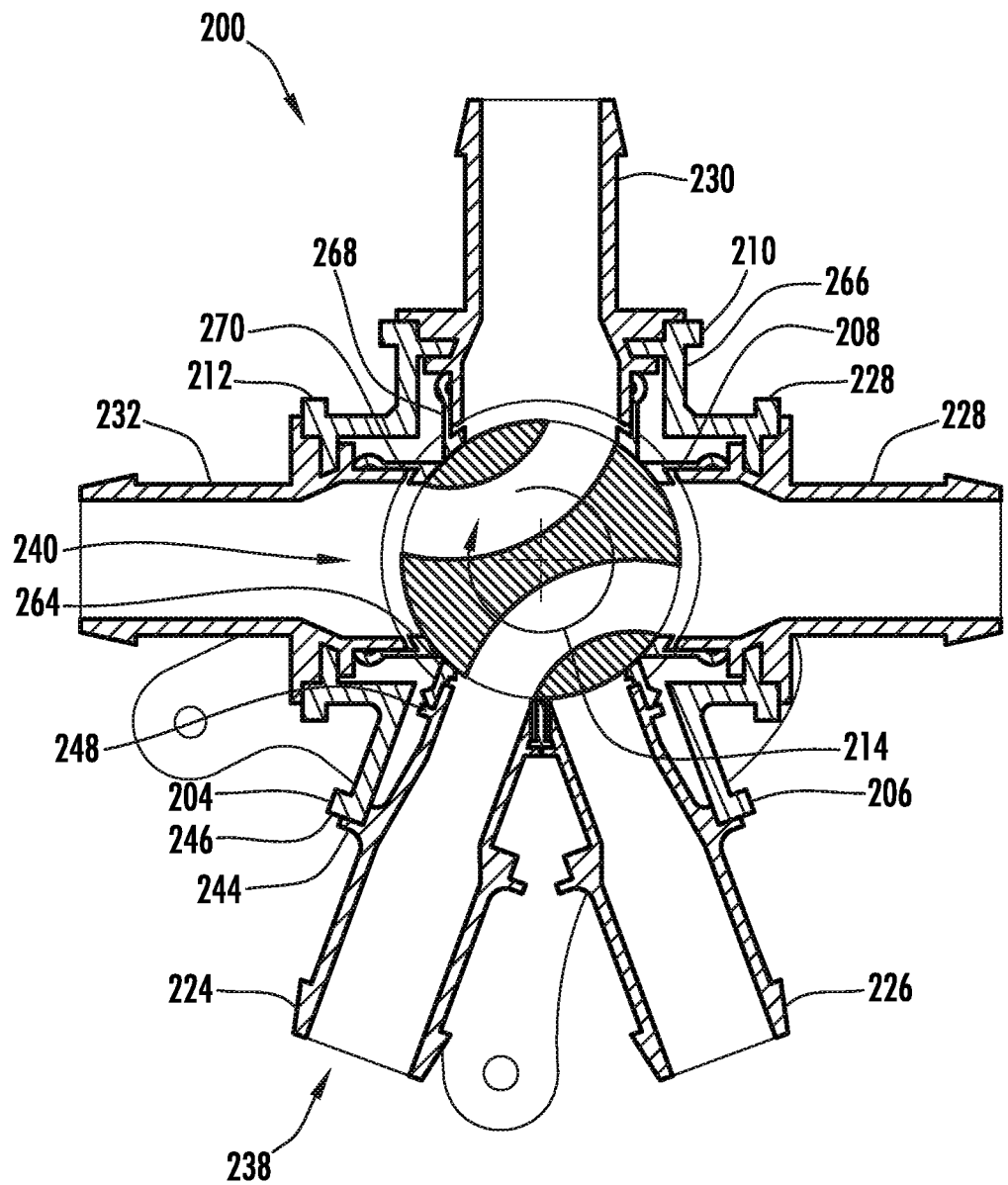
FIG. 20 is a cross section of an alternative embodiment of a multiport valve according to the teachings herein.

With particular reference to FIG. 20, valve 200 includes a housing 202 that includes a plurality of ports, namely, a first port 204, second port 206, third port 208, fourth port 210, and fifth port 212. Instead of using an over/under configuration for first and second ports 142, 144 as described above relative to ports 42, 44, however, first and second ports 204, 206 are arranged in a side-by-side configuration. With this arrangement, first and second ports 204, 206 are spaced apart in the angular direction θ and located at the same axial height relative to longitudinal axis 214.

A plurality of port bodies, namely, a first port body 224, a second port body 226, a third port body 228, a fourth port body 230, and a fifth port body 232 are respectively received in the first through fifth ports 204, 206, 208, 210, 212 as illustrated. The port bodies 224, 226, 228, 230, 232 are substantially identical to one another. Accordingly, a description will be provided for the first port body 224 which applies equally well to the remaining port bodies.

First port body 224 includes a through bore 238 which communicates with an internal cavity 240 containing a shell body 242 rotatably disposed therein. Shell body 242 is identical to shell body 158 described above in both structure and function, and as such, a description thereof is not repeated here.

A first radially protruding flange 244 extends radially outwardly from first port body 224. This first radially protruding flange 244 abuts an abutment face 246 at first port 204 and is sealed against the same via welding, adhesion, or any other mechanical joining technology. As can be seen in FIG. 20, each port 204, 206, 208, 210, 212 includes an abutment face for abutment with the first radially protruding flange of each port body 224, 226, 228, 230, 232.

A second radially protruding flange 248 also extends radially from first port body 224. This second radially protruding flange 248 biases a first seal segment 264 against shell body 242. As can be seen in FIG. 20, first seal segment 264 provides a seal against shell body 242 for each of first and second port bodies 224, 226. It will be recognized that this shared seal configuration is similar to that described above with respect to FIG. 17.

As can be seen in FIG. 20, first and second port bodies 224, 226 collectively bias first seal segment 264 against shell body 242. Each of first and second port bodies 224, 226 are partially received by first seal segment 264 as shown until their respective second radially protruding flanges (see e.g. second radially protruding flange 248 of first port body 224) abuts seal segment 264.

In a similar fashion, the remaining third through fifth port bodies 228, 230, 232 each partially extend into a second through fourth seal member 266, 268, 270, respectively, and bias the same into sealing engagement with shell body 242. In total, there are four seal members 264, 266, 268, 270 for the five ports 204, 206, 208, 210, 212 which seal each port from each other port such that there is no unwanted cross flow. First seal member is shared by first and second port bodies 224, 226, while the remaining seal members 266, 268, 270 are respectively associated with the third through fifth port bodies 228, 230, 232 in a one-to-one relationship. Each seal member 264, 266, 268, 270 may be formed of a resilient material to ensure a conformed seal against the shell body 242.

Figure 21:
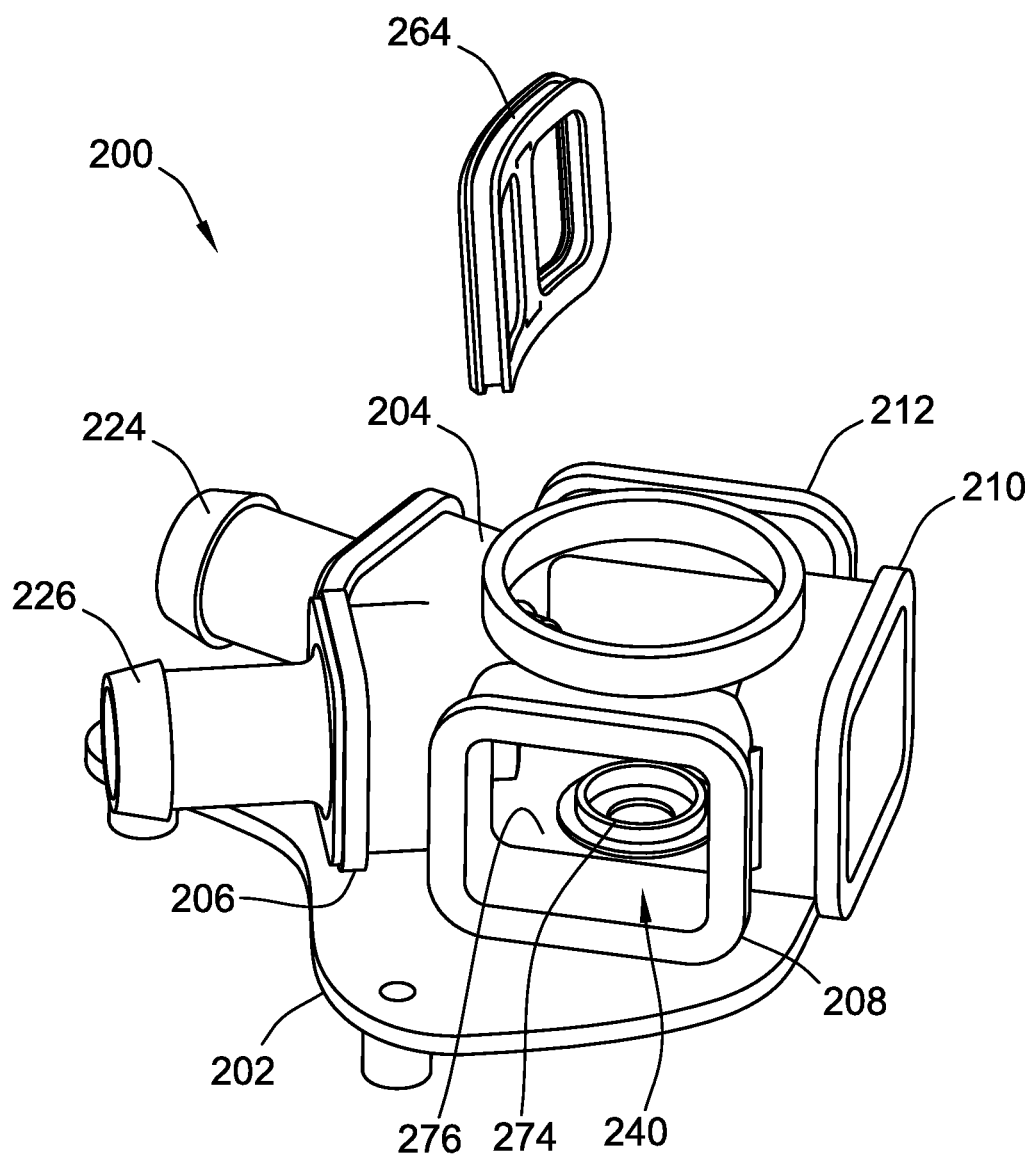
FIG. 21 is a perspective assembly view of the embodiment of FIG. 20.

With reference now to FIG. 21, housing 202 is illustrated with the third through fifth port bodies 228, 230, 232 removed from their respective ports. Additionally, shell body 242 is also removed, as well as a covering for housing 202. As can be seen in this view, housing 202 includes an opening 272 for reception of shell body 242 during assembly. A cover (not shown) is sealingly attached to opening 272 to seal shell body 242 within internal cavity 240.

The aforementioned cover may be permanently affixed to housing 202 using any mechanical joining technology, e.g. adhesives, welding, etc. Alternatively, this cover may be removably attached to housing 202 using fasteners, threads, or the like. In the case of a removable cover, appropriate seals may also be utilized in conjunction with said cover.

Housing also includes an aperture 274 extending through a bottom wall 276 of housing 202. This aperture is sized to receive a valve stem (not shown) attached to shell body 242. Rotation of this valve stem results in a like rotation of shell body 242 within internal cavity 240. As was the case with the above discussed cover, appropriate seals may be used in conjunction with the valve stem to prevent a leak path along the valve stem and out of housing 202.

Figure 22:
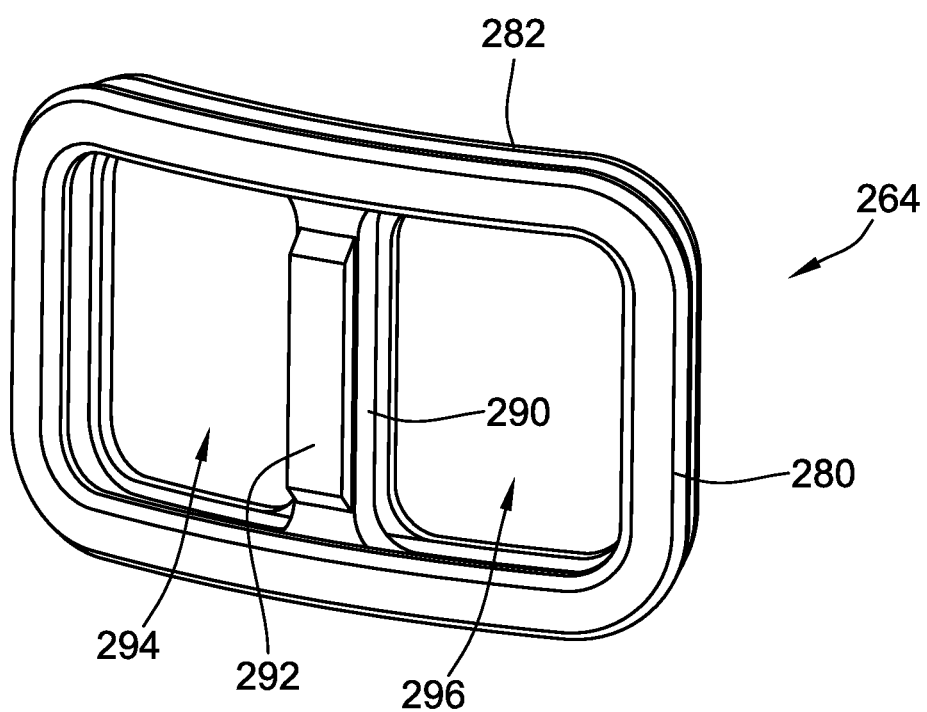
FIG. 22 is a perspective view of a seal member of the embodiment of FIG. 20.
Figure 23:
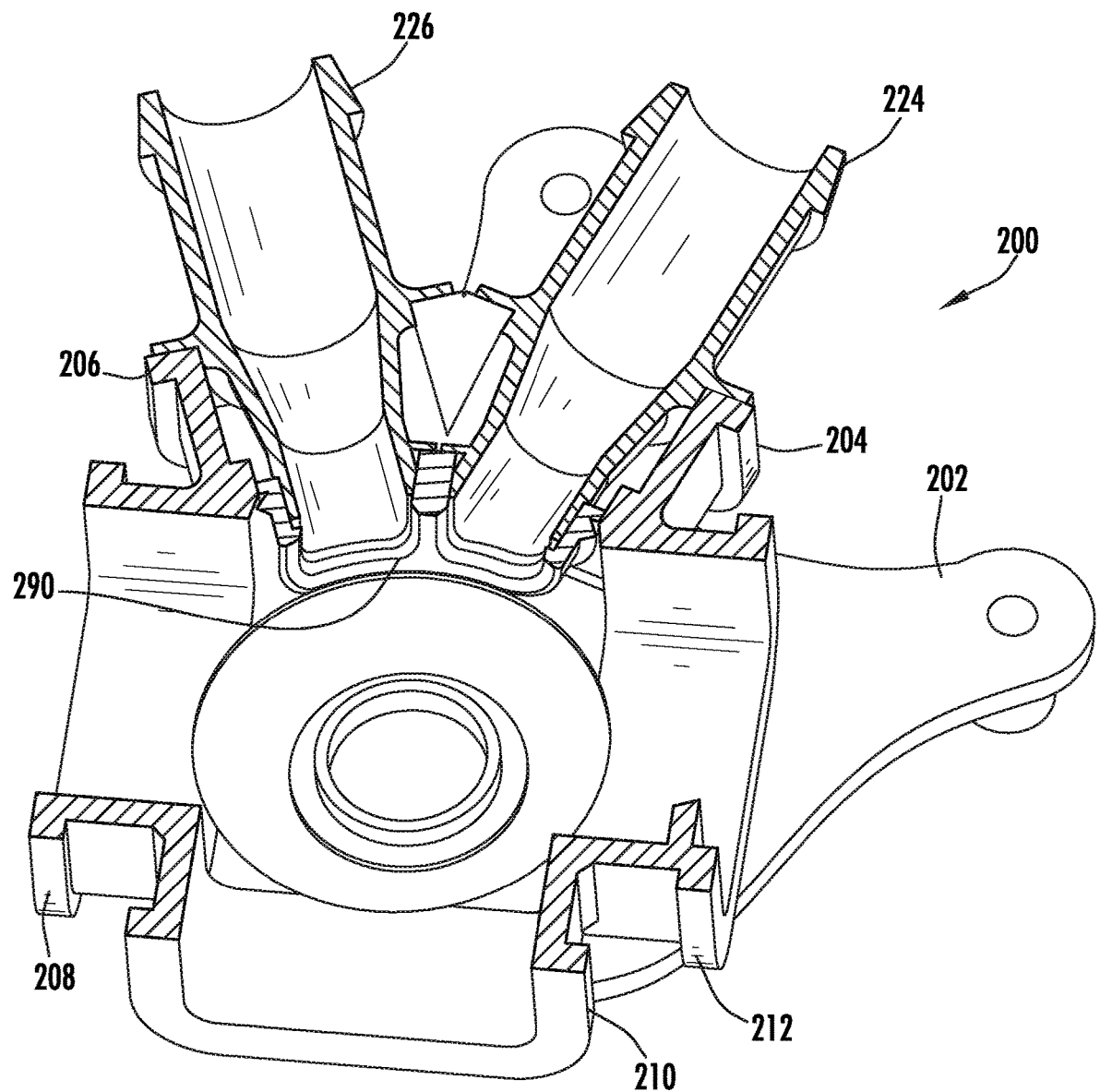
FIG. 23 is another cross section the embodiment of FIG. 20.

Referring now to FIG. 22, first seal member 264 includes a first seal flange 280 which abuts the second radially protruding flange of each of the first and second port bodies 224, 226 (see e.g. flange 248 in FIG. 20). First seal member 264 also includes a second flange 282 which sealingly engages the outer periphery of shell body 242 (see also FIG. 20).

First seal member 264 also includes an intermediary portion 290 dividing first seal member 264 into a first seal portion 294 and a second seal section 296. First seal section 294 is responsible for sealing the flow through first port 204 (and more particularly first port body 224) such that it may only selectively flow through shell body 242. Second seal section 296 is responsible for sealing the flow through second port 206 (and more particularly second port body 226) such that it may only selectively flow through shell body 242.

Intermediary portion 290 provides a common surface 292 for contact with the second radially protruding flange of each of first and second port bodies 224, 226. It will be recognized that the remaining seal members 266, 268, 270 have the same overall design as seal member 264, except that they do not include an intermediary portion.

Despite their close proximity and despite that they share a common seal, first and second ports 204, 206 and their respective port bodies 224, 226 are sealed off from one another. Flow mixing of the flows through first and second ports 204, 206 is, however, still possible by aligning one of the passageways through shell body 242 with both the first and second port bodies 224, 226. As can be readily surmised from inspection of FIG. 23, the smaller the size of the intermediary seal portion the higher the granularity in the mixing capabilities between the first and second port bodies 224, 226.

As described herein, embodiments of the present invention The multi-port valve advantageously overcomes existing problems in the art by presenting an overall construction with a reduced part count, a reduced number of potential leak paths, and a reduction in overall assembly time and cost.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A multi-port valve, comprising:
   a housing defining an internal cavity, the housing further comprising a plurality of ports, wherein each of the plurality of ports is in communication with the internal cavity;
   a shell body rotatably disposed within the internal cavity; and
   a seal member having a plurality of openings and surrounding the shell body such that it circumscribes the shell body within the internal cavity;
   wherein the plurality of ports includes a first port, a second port, and a third port, wherein the first port and the second port of the plurality of ports are arranged relative to one another such that they are angularly spaced apart from one another in an angular direction and situated at a same axial height relative to a longitudinal axis of the housing; and
   wherein the third port is in at least a partially angularly overlapped arrangement relative to one of the first port or the second port in the angular direction and is axially spaced from the first port and the second port relative to the longitudinal axis;
   wherein each opening of the plurality of openings of the seal member is associated with one of the plurality of ports such that each of the plurality of ports are sealed from one another along the outer periphery of the seal member.

2. A multi-port valve, comprising:
   a housing defining an internal cavity, the housing further comprising a plurality of ports, wherein each of the plurality of ports is in communication with the internal cavity;
   a shell body rotatably disposed within the internal cavity; and
   a seal member having a plurality of openings and surrounding the shell body such that it circumscribes the shell body within the internal cavity;
   wherein the plurality of ports includes a first port, a second port, and a third port, wherein the first port and the second port of the plurality of ports are arranged relative to one another such that they are angularly spaced apart from one another in an angular direction and situated at a same axial height relative to a longitudinal axis of the housing; and
   wherein the third port is in at least a partially angularly overlapped arrangement relative to one of the first port or the second port in the angular direction and is axially spaced from the first port and the second port relative to the longitudinal axis;
   wherein the shell body includes a partition wall separating the shell body into a first portion and a second portion, wherein the first and second portions are selectively alignable with the plurality of ports to allow simultaneous flow along a first flow path and a second flow path through the shell body.

3. The multi-port valve of claim 2, wherein the first portion includes a first opening and a second opening separated by a wall, and the second portion includes a first opening, a second opening, and a third opening.

4. The multi-port valve of claim 2, wherein the seal member is one of a continuous piece of elastomeric material, or comprises a rigid core with a plurality of elastomeric seals attached thereto.

5. The multi-port valve of claim 1, wherein the seal member seals outwardly in a radial direction against an interior surface of the housing.

6. A multi-port valve, comprising:
- a housing defining an internal cavity, the housing further comprising a plurality of ports, wherein each of the plurality of ports is in communication with the internal cavity;
- a shell body rotatably disposed within the internal cavity; and
- a seal member having a plurality of openings, wherein each opening of the plurality of openings is associated with one of the plurality of ports such that each of the plurality of ports are sealed from one another along the outer periphery of the seal member;

wherein the seal member is one of a continuous cylindrical piece of elastomeric material, except for the plurality of openings formed therein, surrounding the shell body, or comprises a rigid core with a plurality of elastomeric seals attached thereto; and wherein the shell body includes a partition wall separating the shell body into a first portion and a second portion, wherein the first and second portions are selectively alignable with the plurality of ports to allow simultaneous flow along a first flow path and a second flow path through the shell body.

7. The multi-port valve of claim 6, wherein the first portion includes a first opening and a second opening separated by a wall, and the second portion includes a first opening, a second opening, and a third opening.

8. The multi-port valve of claim 6, wherein the seal member seals outwardly in a radial direction against an interior surface of the housing.

* * * * *